United States Patent [19]

Eggert et al.

[11] 4,138,237
[45] Feb. 6, 1979

[54] METHOD OF AND APPARATUS FOR SHAPING AND HEAT TREATING GLASS SHEETS

[75] Inventors: John N. Eggert, Toledo; Richard A. Herrington, Walbridge; Waldemar W. Oelke, Rossford, all of Ohio

[73] Assignee: Libbey-Owens-Ford Company, Toledo, Ohio

[21] Appl. No.: 854,120

[22] Filed: Nov. 23, 1977

[51] Int. Cl.² .................. C03B 23/02; C03B 27/00
[52] U.S. Cl. ................................ 65/104; 65/106; 65/268; 65/273
[58] Field of Search ............ 65/104, 268, 273, 275, 65/106, 107

[56] References Cited
U.S. PATENT DOCUMENTS

| | | | |
|---|---|---|---|
| 3,684,473 | 8/1972 | Ritter, Jr. | 65/104 |
| 3,782,916 | 1/1974 | Powell et al. | 65/104 |

*Primary Examiner*—Arthur D. Kellogg
*Attorney, Agent, or Firm*—Collins, Oberlin & Darr

[57] ABSTRACT

A transfer apparatus in a glass heat treating operation for removing a horizontally disposed sheet from a horizontal glass processing line and reorienting it into a substantially vertical plane for final processing in a vertically oriented quench operation. The transfer apparatus constitutes a pivotal end section of a horizontal conveyor system and is adapted to be equipped with glass bending fixtures.

9 Claims, 7 Drawing Figures

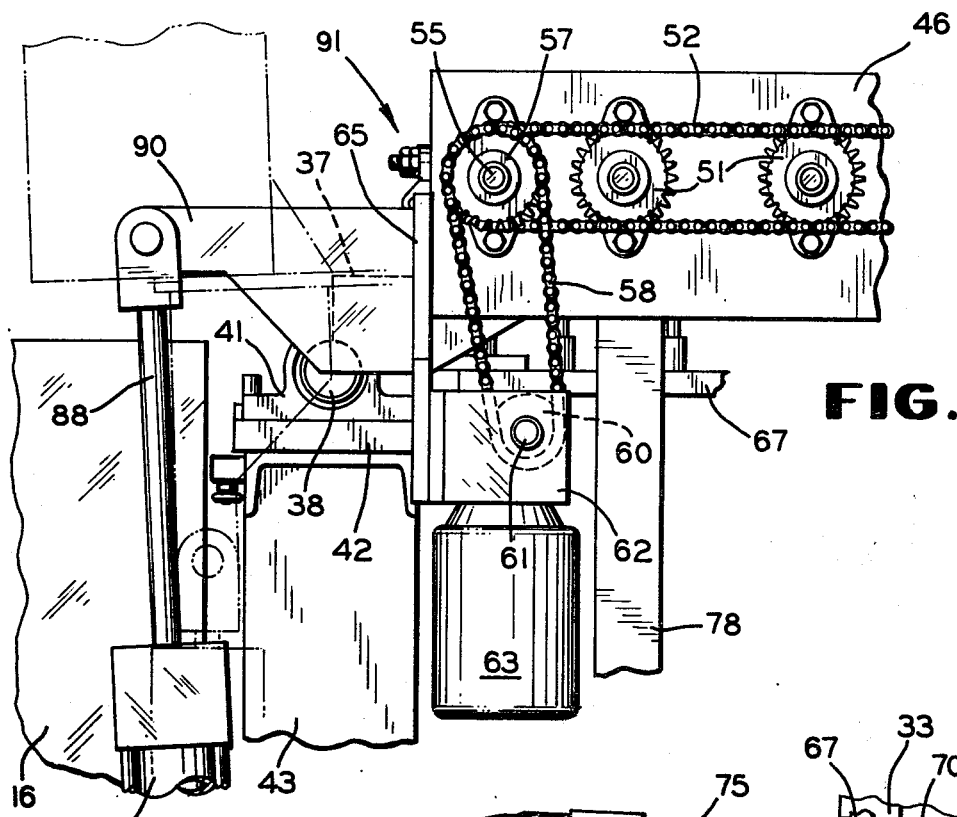
FIG. 5
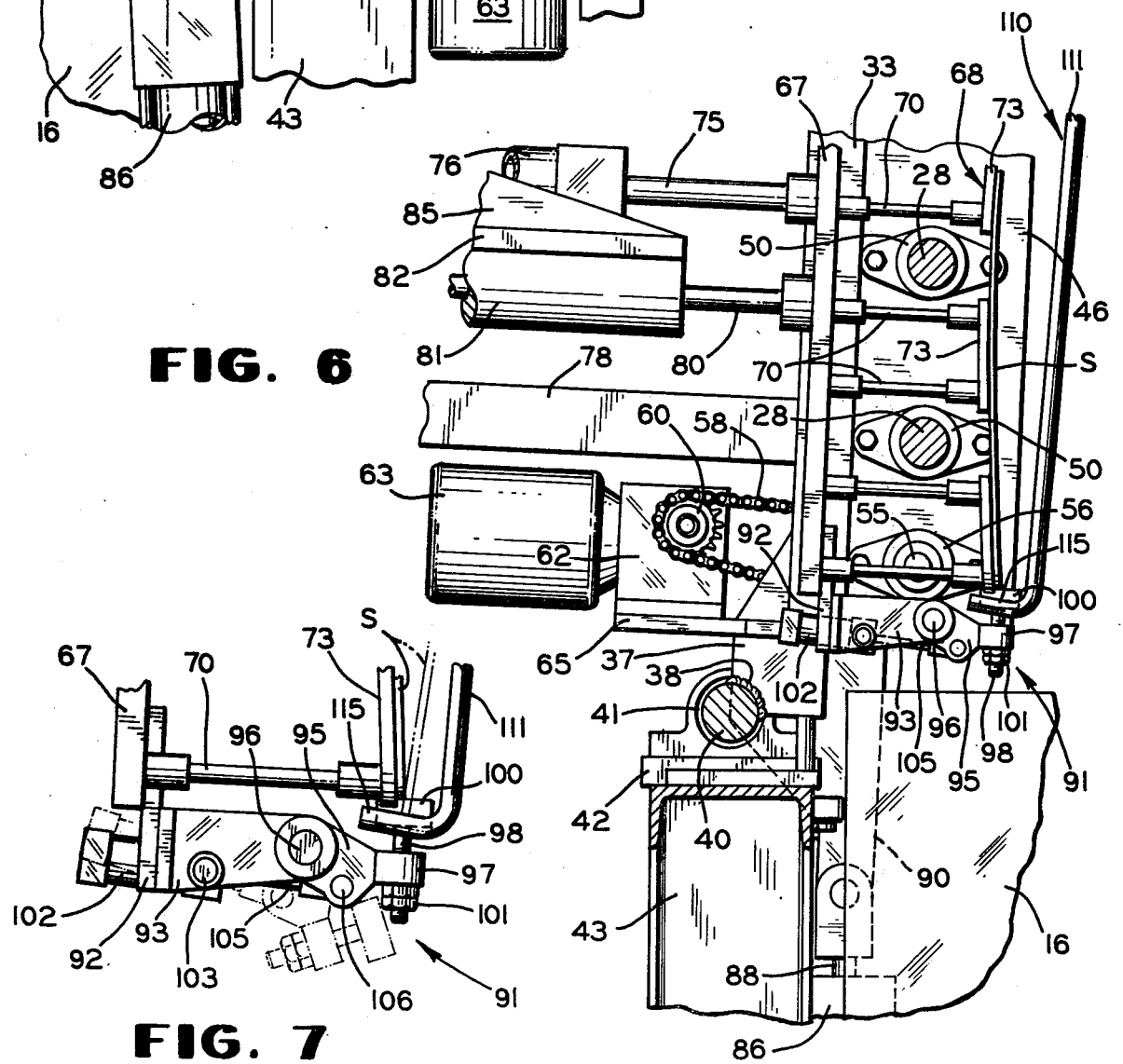
FIG. 6
FIG. 7

METHOD OF AND APPARATUS FOR SHAPING AND HEAT TREATING GLASS SHEETS

BACKGROUND OF THE INVENTION

The present invention relates generally to the production of bent, tempered sheets of glass and, more particularly, to a transfer apparatus for reorienting a glass sheet from a horizontal plane to a substantially vertical plane for optimum processing.

Generally, the commercial production of bent, tempered glass sheets, such as are utilized as glazing closures for automobiles and the like, includes heating the sheets to the softening point of the glass, bending the heated sheets to the desired curvature and thereafter chilling the sheets in a controlled manner to a temperature below the annealing range of the glass.

One successful method for producing such sheets in large quantities involves carrying out these steps continuously in a mass production, horizontal line operation whereby the sheets are supported in a horizontal plane and advanced on externally driven conveyor roll-type conveyors in a horizontal path successively through a heating area, a bending area and a heat treating or chilling area for tempering the bent sheets. In a horizontal production line such as described above, the tempering is usually effected by directing opposed streams of cooling fluid, such as air or the like, toward and against the opposite surfaces of the sheet as they are advanced in the aforementioned horizontal path.

While this horizontal production line glass bending and tempering operation has proven to be highly successful and admirably suited for the production of automotive glass sheets of conventional thicknesses, say about 0.125 inch and thicker for example, problems are encountered in commercially processing thinner glass sheets by this procedure. For example, the air tempering of glass sheets having thicknesses less than 0.125 inch sometimes creates optical and surface defects in the glass surfaces because of the pitting or dimpling effect caused by the air streams impinging against the opposite surfaces of the thin heat-softened sheets. Moreover, the tremendous power requirements necessary to generate the necessary pressure and volume to effect proper tempering of such thin sheets, if attainable, and which is completely dissipated into the atmosphere, add materially to production costs.

Various attempts have been made to overcome this problem in the horizontal processing of thin tempered glass sheets, i.e. sheets having thicknesses ranging from about 0.090 to 0.125 inch for example. One such effort involved the use of a different cooling medium, such as a liquid bath, for example. However, it was found virtually impossible to uniformly cool the opposite surfaces of the sheets at the same cooling rate when employing a liquid medium adapted to receive horizontally oriented sheets in a continuous horizontal production line operation.

SUMMARY OF THE INVENTION

Accordingly, it is a primary object of the present invention to provide a solution to the above problem encountered in a horizontal production line while retaining the advantages found therein by providing a transfer apparatus for rapidly transferring glass sheets from a substantially horizontal orientation to a vertical disposition for optimum processing.

It is another object of this invention to provide a pivotal transfer apparatus for receiving a heat-softened glass sheet in a horizontal plane and reorienting the same in a vertical plane for release into a vertically oriented cooling medium.

The foregoing and other objects, advantages, and characterizing features of the present invention will become clearly apparent from the ensuing detailed description of an illustrative embodiment thereof, taken together with the accompanying drawings, wherein like reference numerals denote like parts throughout the various views.

BRIEF DESCRIPTION OF THE DRAWINGS

FIG. 5 is a fragmentary side elevational view, on an enlarged scale, looking in the direction of arrows 5—5 of FIG. 3;

FIG. 6 is an enlarged fragmentary side elevational view, showing the transfer apparatus in a glass releasing position; and FIG. 7 is an enlarged fragmentary elevational view, showing details of a glass stop and catcher arrangement.

DESCRIPTION OF THE PREFERRED EMBODIMENT

Figure 1:
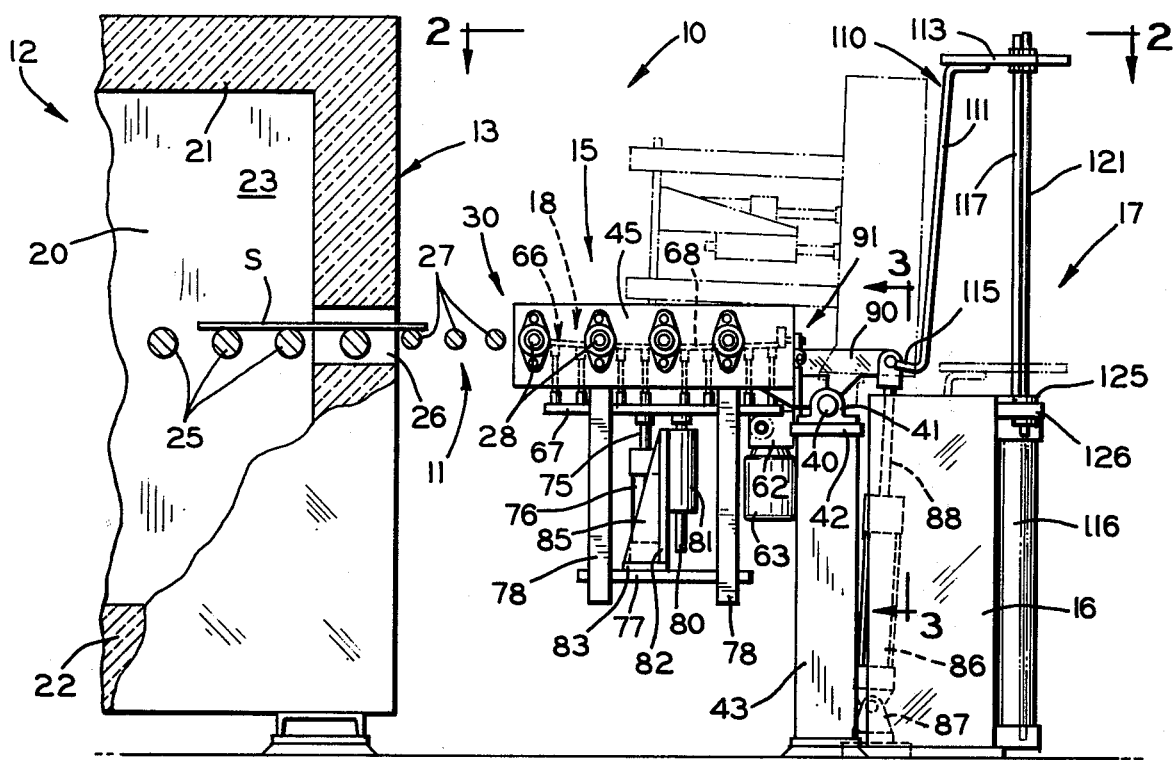
FIG. 1 is a side elevational view of a bending and tempering apparatus embodying the novel features of this invention.

Referring now in detail to the illustrative embodiment depicted in the accompanying drawings, there is shown in FIG. 1 a glass sheet heat treating apparatus, comprehensively designated 10, which includes a conveyor system 11 adapted to support a plurality of sheets S in a generally horizontal plane for movement along a continuous, substantially horizontal path through a heating station 12 having a furnace 13 and then onto a transfer apparatus, generally designated 15, constructed in accordance with this invention and which forms an extension or part of the continuous conveyor system 11. The transfer apparatus 15 is located in an aligned position with the exit end of the furnace 13 for receiving a properly heated glass sheet therefrom and is pivotal to reorient the heated sheet from a horizontal plane to a substantially vertical plane for release into a quench tank 16 at a tempering station 17 as will hereinafter be explained in detail.

It should be appreciated that one of the most efficient techniques for commercially mass producing large quantities of tempered and/or bent glass sheets continuously is the so-called "horizontal" production line process wherein glass sheets are heated, bent and cooled in a continuous process while being advanced successively on conveyor rolls in a horizontal plane along a horizontal path through a heating area, a bending area and a cooling area. The above procedure offers many advantages over the vertical processing of glass sheets wherein the latter are suspended in a vertical plane from gripping tongs for processing through the various stations. In comparison, for example, the horizontal technique promotes increased production rates, avoids the glass dimpling and deformation caused by the tong marks associated with vertical processing, and offers greater control in preserving the desired shape imparted to the heat-softened glass sheets.

However, because chilling is effected by air or a gaseous medium in a true horizontal line operation, there are practical limitations as to glass sheet thicknesses that can be successfully and repeatedly processed by air tempering without sacrificing optical quality and without rendering production costs prohibitive. Moreover, tempering by submersion or quenching in a bath of liquid or other cooling medium, which can readily accommodate thin glass sheets without adverse effects, has not heretofore been found practical in a truly horizontally oriented production line.

In accordance with the present invention, the advantages associated with a horiozntal line glass operation and a vertical quench or tempering operation, respectively, are retained by interposing the transfer apparatus 15 therebetween for reorienting glass sheets from a horizontal disposition to a vertical disposition to accommodate and heat treat glass sheets of relatively thin dimensions, say sheets having thicknesses ranging from about 0.080 to 0.125 inch for example.

The transfer apparatus 15 of the illustrative embodiment herein depicted also includes a bending apparatus 18 of the type in which sheets are bent by inertial and gravitational forces as will hereinafter be more thoroughly described. While the transfer apparatus 15 of this invention embodies an inertia-gravity type bending apparatus, it should be appreciated that the bending apparatus 18 may consist of a female type press ring cooperable with a male press ring located thereabove which can be either mounted for pivotal movement along with the female press ring or held in place thereabove on superstructure forming a part of the framework of the heat treating apparatus 10. Alternatively, where only desired to temper flat glass sheets, the bending fixtures may be entirely omitted from the transfer apparatus 15, in which case the latter would serve as a pivotally mounted conveyor end section.

The furnace 13 is of the tunnel-type construction having a heating chamber 20 defined by a top wall 21, a bottom wall 22, and opposite side walls 23, all formed of a suitable refractory material. The chamber 20 can be heated in any desired manner by suitable heating means, such as gas fired burners or electrical resistance elements for example (not shown), located in the top and side walls of the furnace 13. The sheets are advanced through the heating chamber 20 on a series of conveyor rolls 25, which form a part of the conveyor system 11, and extend from the entrance end (not shown) of the furnace 13, through an oppositely disposed exit end, and toward the transfer apparatus 15. The sheets are heated to substantially the softening point of the glass during their passage through the chamber 20 and, upon emerging from an opening 26 in the exit end of the furnace 13, are received on a second series of conveyor rolls 27, also forming a part of the conveyor system 11. The series of rolls 27 support the glass sheets for advancement onto a third series of conveyor rolls 28, which are mounted on the transfer apparatus 15 for pivotal or swinging movement therewith and which form a continuation of the conveyor system 11 as an end section pivotal relative to the remainder of the conveyor system 11.

The transfer apparatus 15 includes the series of conveyor rolls 28, the supporting structure therefor, a bending apparatus 18 and its supporting structure as will presently be described. The conveyor rolls 28 are mounted on a structural frame, generally designated 30, which includes a structural member 31 of generally U-shaped configuration in plan (FIG. 2) comprised of opposite leg portions 32 and 33 connected together by a bight portion 35. The ends of legs 32 and 33 are welded or otherwise fixedly secured to plates 36, in turn rigidly secured to laterally spaced pivot blocks 37 which are rigidly secured, as by weldments 38, to a pivot shaft 40. The opposite ends of the pivot shaft 40 are suitably journalled in bearing blocks 41 carried on a transversely extending structural plate 42 supported at its opposite ends on laterally spaced, upright beams 43. Thus, the entire frame 30 is mounted for pivotal movement on shaft 40 between its lower glass receiving position shown in full lines in FIG. 1 and an upper, glass releasing position shown in dotted lines in FIG. 1.

Figure 2:
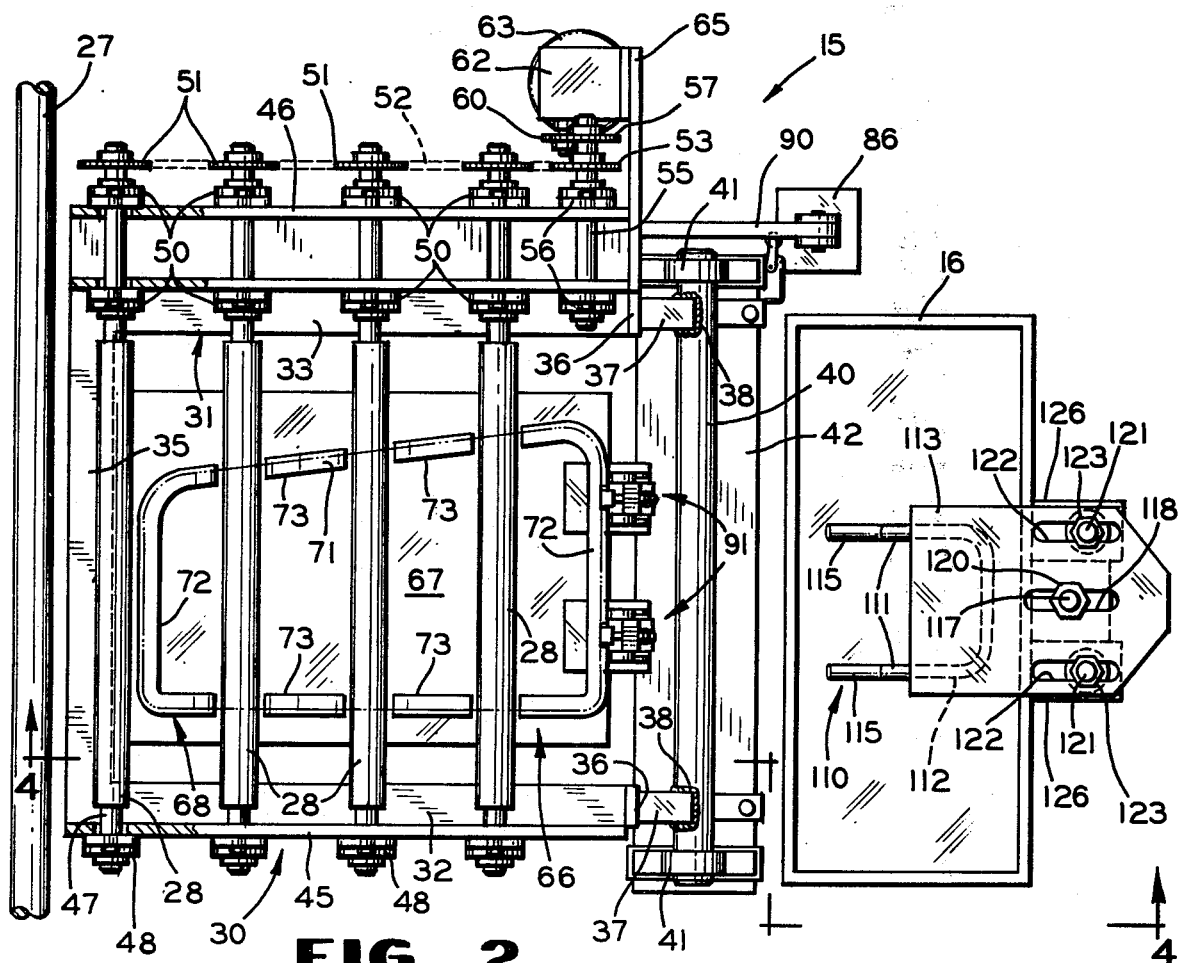
FIG. 2 is a fragmentary top plan view, on an enlarged scale, looking in the direction of arrows 2—2 of FIG. 1, showing the transfer apparatus constructed in accordance with this invention.

The means for supporting conveyor rolls 28 include a horizontally extending side plate 45 rigidly secured to the outer side of leg 32 and a horizontally extending channel member 46 affixed along its inner leg to the outer side of leg 33. The conveyor rolls 28 are provided with rotatable drive shafts 47 suitably journalled for rotation at their one ends in bearings 48 mounted on the plate 45 and adjacent their other ends in axially spaced bearings 50 mounted on the upstanding spaced legs of channel member 46, as best shown in FIG. 2.

The means for rotating conveyor rolls 28 in unison includes pinions 51 suitably mounted on the roll shafts 47 adjacent their one ends and which are driven by a common endless drive chain 52. The chain 52 is entrained about a drive sprocket 53 mounted on a stub shaft 55 journalled for rotation in suitable bearings 56 mounted on the legs of channel member 46. The stub shaft 55, in turn, is rotated by an idler sprocket 57 mounted thereon in axially spaced relation to sprocket 53 and which is driven by a drive chain 58 also entrained about a drive sprocket 60 rigidly secured to an output shaft 61 driven for rotation, via gear reduction mechanism 62, by an electric motor 63 connected to a suitable source of electric power (not shown). The motor 63 is directly attached to the gear reduction mechanism 62 which is affixed to a support bracket 65 welded or otherwise fixedly secured to channel member 46. Thus, the motor 63 and the entire drive arrangement for conveyor rolls 28 are mounted on swingable frame 30 for pivotal movement therewith.

In the illustrative embodiment depicted in the drawings, the bending apparatus 18 comprises a mold 66 of outline or ring-type construction and includes a base member or platen 67 and a shaping rail 68 connected to the base member 67 by means of a series of connecting rods 70. The shaping rail 68 conforms in outline to the glass sheets S to be bent and is provided on its upper face with a generally concave shaping surface 71. To permit displacement of the shaping rail 68 above the level of conveyor rolls 28 for lifting the sheets thereabove to effect bending, the shaping rail 68 is formed of a plurality of segments (FIGS. 2 and 4) including end bars 72 extending generally in a direction parallel to rolls 28 and side bars 73 extending generally transversely to the conveyor rolls 28 and spaced apart from each other a sufficient distance to pass between adjacent rolls 28. The bars 72 and 73 have their upwardly directed surfaces arranged to form the generally concave shaping surface 71.

The platen 67 is supported on and vertically movable by the piston rod 75 of a fluid actuating cylinder 76 mounted on a base member 77, which in turn is welded or otherwise fixedly secured to the bight portions of a pair of laterally spaced, U-shaped support members 78 rigidly secured at their upper ends to the structural member 31 of frame 30. A pair of vertically extending guide rods 80 are rigidly secured at their upper ends to the underside of platen 67 and extend downwardly through suitable bushing blocks 81 mounted on an upright plate 82 affixed to a base plate 83 carried by base member 77 and suitably reinforced by gusset plates 85. Thus, the mold 66, together with its supporting structure and actuator, are mounted, via base member 77 and support member 78, on the frame 30 for pivotal movement therewith about pivot shaft 40.

The means for swinging the frame 30 between positions shown in full and dotted lines in FIG. 1 includes a fluid cylinder 86 pivotally mounted at its head end to an upstanding lug 87 suitably anchored to the floor of a substructure forming a part of the production facility. The cylinder 86 is provided with the usual reciprocal piston (not shown) connected to a piston rod 88. The piston rod 88 is pivotally connected to a pivot arm 90 secured to the support bracket 65 of frame 30.

Figures 3, 4:
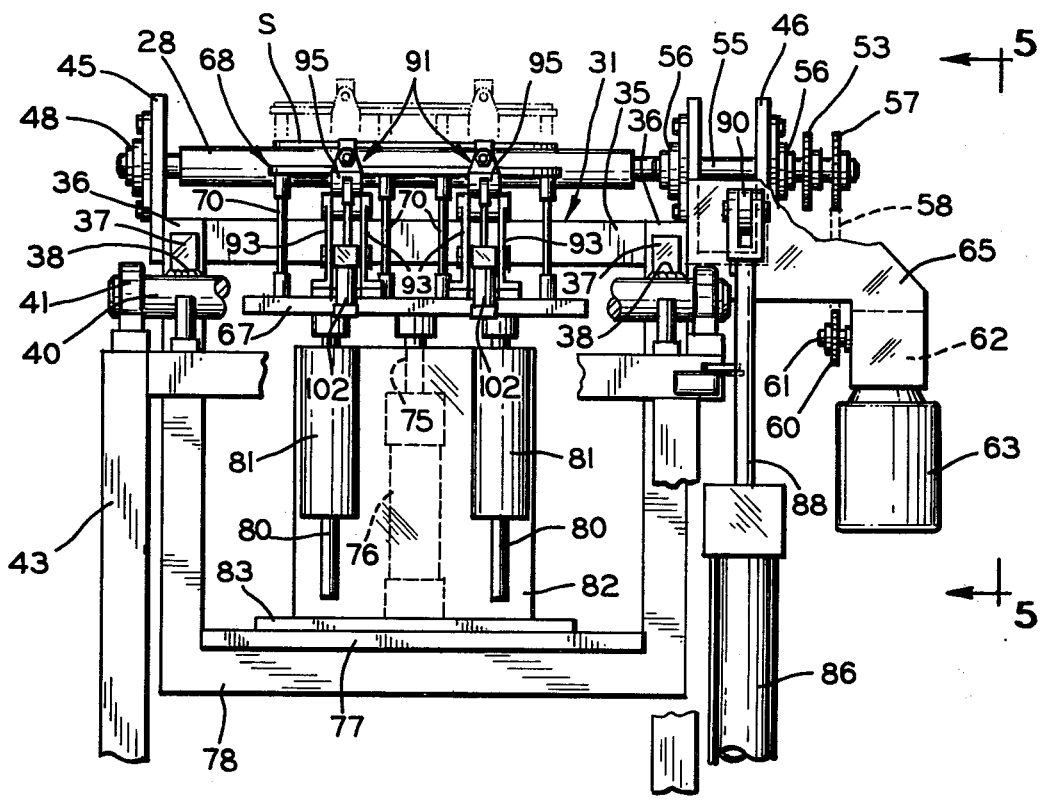
FIG. 3 is a rear end elevational view, looking in the direction of arrows 3—3 of FIG. 1, with parts broken away for clarity.
FIG. 4 is a vertical sectional view, taken along the line 4—4 of FIG. 2, and showing the transfer apparatus in a glass receiving position.

In order to properly position the sheets on mold 66 and to retain the same thereon during pivotal movement of the mold into a substantially upright position, a pair of stop assemblies, generally designated 91, are secured on the platen 67 for movement therewith. As best shown in FIGS. 4 and 7, each stop assembly 91 includes a supporting structure comprising a base member 92 welded or otherwise rigidly secured to platen 67 and having a pair of laterally spaced, upright supports 93 suitably affixed thereto. A mounting bracket 95 is mounted between supports 93 for pivotal movement about a pivot axis 96.

The upper end of bracket 95 is formed with an integral collar 97 having a tapped bore for receiving a threaded stud 98 to which is attached at the forward end thereof, by any suitable means, a stop member 100 formed of any suitable heat-resistant material, preferably of the type marketed under the tradename "Marinite". A suitable lock nut arrangement 101 is threaded on the stud 98 in abutting engagement against the rear face of collar 97 for securing the stop member 100 in its selectively axially adjusted position, as dictated by the size of the sheets to be processed.

The means for pivoting bracket 95 and thereby the stop member 100 between its glass engaging position shown in full lines in FIG. 7 and its out-of-the way glass disengaging position shown in dotted lines in FIG. 7 includes a fluid cylinder 102 pivotally mounted between the upright supports 93 on a pivot pin 103 secured at the opposite ends thereof in supports 93. Cylinder 102 is provided with the usual reciprocal piston (not shown) having a piston rod 105 pivotally mounted, as shown at 106 in FIG. 7, at its distal end to the mounting bracket 95.

The quench tank 16 at tempering station 17 is located beneath the mold shaping rail 68 in close proximity thereto when in its upright position for receiving the heated bent glass sheet therefrom when released. The quench tank 16 contains a bath of a suitable chilling medium, which may be a liquid or any other suitable matter. The depth of the bath is greater than the height of the glass sheet when vertically disposed. Any suitable means may be employed to maintain the temperature of the bath at a desired temperature for proper tempering.

In order to avoid free fall of the sheet to the quench tank 16 and to control the immersion thereof into the bath, means are provided for receiving the glass sheet from the mold 66 and supporting the same during its descent into the quench tank 16. Such means comprise a "catcher" or receiving element 110 comprised of a pair of laterally spaced, upright legs 111 (FIGS. 2 and 4) connected at their upper ends to and formed integral with a horizontally disposed U-shaped portion 112 welded or otherwise fixedly secured to a horizontally extending, reciprocal mounting plate 113. The lower ends of legs 111 are formed with inwardly turned feet 115 for supporting the lower edge of the glass sheet deposited thereon. As shown in FIGS. 1 and 4, the legs 111 are inclined rearwardly from a true vertical and extend at a slight angle relative thereto to allow the sheet to rest thereagainst by gravity. The feet 115 project substantially perpendicularly inwardly from the legs 111 so as to extend upwardly at a slight angle from a true horizontal plane to facilitate retention of the sheet thereon. The major portion of the legs 111, as well as the feet 115, are covered with a suitable heat-resistant, somewhat resilient material, such as fiber glass for example, to form a sleeve or cover therefor to prevent marring and scratching of the heat-softened sheets S.

The means for reciprocating mounting plate 113 and thereby the glass receiving element 110 includes a fluid actuating cylinder 116 fixedly secured to the rear wall of quench tank 16. The cylinder 116 is provided with the usual reciprocal piston (not shown) having a piston rod 117 projecting at its upper end through an elongated slot 118 (FIG. 2) formed in the mounting plate 113 and suitably secured to the latter by lock nuts 120. The plate 113 and element 110 are guided for vertical movement by rods 121 located on opposite sides of piston rod 117. The upper ends of the rods 121 extend through elongated slots 122 formed in plate 113 and are each secured to the plate 113 by means of lock nuts 123, respectively. These rods 121 are guided for vertical movement in bushings 125 mounted in brackets 126 affixed to the rear wall of quench tank 16. The slot arrangement formed in plate 113 offers adjustability of the receiving element 110 toward and away from the frame 30, as desired, while the threaded portions at the upper ends of piston rod 117 and guide rods 121 permit vertical adjustment of element 110.

The mode of operation of the apparatus of this invention in bending and tempering one sheet of glass is as follows:

A flat glass sheet S is loaded onto the conveyor rolls 25 at the entrance end (not shown) of the furnace 13 for movement through the heating chamber 20 wherein the sheet is heated to substantially its softening point or bending temperature. This heated sheet passes through the opening 26 and is successively transferred onto conveyor rolls 27 and then conveyor rolls 28 of the pivotal conveyor section of the transfer apparatus 15. The sheet is accurately located above the mold 66 when the leading edge thereof engages the stop members 100 located in the path of the horizontally moving sheet.

A photoelectric cell (not shown), or other suitable detection device, senses the entry of the glass sheet into the bending area for initiating a bending cycle by energizing timing mechanisms which control the actions of the mold actuating cylinder 76 and the transfer apparatus actuating cylinder 86. The timing mechanism is so designed that the mold 66 begins its ascent by actuation of cylinder 76 when a sheet is accurately positioned by means of engagement with the stop members 100. The mold 66 moves rapidly upwardly causing the shaping rail 68 to engage the marginal edge of the sheet and lift the latter off the rolls 28 quickly. The combined effects of inertial and gravitational forces acting on the sheet as it is raised by the shaping rail 68 above the rolls 28 (FIG. 4) causes the glass sheet to sag into conformity with the shaping surface 71 of the mold shaping rail 68. The stop members 100, which are mounted on the movable platen 67, remain engaged with the leading edge of the sheet.

At the same time that the mold 66 is raised to effect bending, the cylinder 86 is actuated to retract piston rod 88 for swinging the frame 30, together with all the components mounted thereon, about the pivot shaft 40 into a vertical attitude, as shown in FIG. 6 and in phantom in FIG. 1. Bending of the sheet is completed quickly during the early swinging movement of the frame 30. The bent sheet, supported against the shaping rail 68 and along its leading edge by stop members 100, continues to be swung along with the mold 66 into a generally upright position in close proximity to the legs 111 of receiving element 110 with the leading edge of the now vertically disposed sheet spaced just slightly above feet 115 of element 110. The momentum imparted to the sheet during its pivotal movement on frame 30 causes the sheet to continue in its arcuate path upon stoppage of the frame 30 so that it passes a true vertical position and comes to rest against the legs 111 of receiving element 110. During this arcuate movement past true vertical, the sheet pivots about the leading or lower edge of the sheet which is supported on the stop members 100. The cylinders 102 are then actuated to retract their respective piston rods for pivoting brackets 95 and lowering stop members 100 to deposit the glass sheet onto the feet 115 of receiving element 110. The sheet is not dropped onto feet 115. Rather, the retracting stops 100 operate to lower the glass sheet gently onto feet 115 so that the lower edge of the sheet gingerly engages the feet for a smooth and easy transition. Cylinder 116 is actuated substantially simultaneously with the release of the bent sheet to retract piston rod 117 and lower the sheet into the quench tank 16 for immersion into the bath of coolant contained therein. The sheet is immersed within the bath for a time sufficient to properly temper the sheet and is then withdrawn from the bath by raising the receiving element 110, via cylinder 116, into its upper position shown in FIG. 1.

It should be appreciated that the sequence of operations in bending the sheet, pivoting it into an upright position and then transferring the same onto the element 110 upon which it is lowered into the quench bath is performed rapidly to retain the requisite heat necessary for proper tempering.

From the foregoing, it is apparent that the objects of the invention have been fully accomplished. As a result of this invention, a novel transfer apparatus is provided for reorienting a heated glass sheet, whether flat or bent, from a horizontal plane into a vertical plane. This feature permits combining a horizontal glass processing system with a vertically oriented quench system to successfully heat treat thin glass in a manner retaining the advantages of both systems. Thus, a sheet heated and, if desired, bent in a horizontal production line is transposed from its horizontal disposition into a vertical disposition for immediate vertical immersion in the coolant medium of a quench tank. Accordingly, very thin glass, having thicknesses on the order of 0.090 inch and less, can now be satisfactorily processed on the major portion of a horizontal production line by virtue of the transfer apparatus of this invention.

It is to be understood that the form of the invention herewith shown and described is to be taken as an illustrative embodiment of the same, and that various changes in the shape, size and arrangement of parts, may be resorted to without departing from the spirit of the invention.

We claim:

1. A method for heat treating a glass sheet comprising: supporting and conveying a glass sheet in a substantially horizontal plane for movement along a horizontal path, heating said sheet during said movement through a heated atmosphere and while so supported, advancing said sheet in said path onto a pivotal frame in bending relation to a shaping surface on said frame disposed below said path, locating the leading edge of said sheet against stop means provided on said frame, lifting said shaping surface to engage and raise said sheet above said path to effect shaping thereof, swinging said frame from a substantially horizontal plane into a substantially vertical plane to pivot said sheet about said leading edge in an arcuate path past a true vertical and into an inclined attitude against an adjacently positioned glass receiving means, and lowering said receiving means into a cooling medium for chilling said glass sheet.

2. A method according to claim 1, including accelerating said shaping surface and said sheet upwardly to cause the sheet to settle under the influence of inertial and gravitational forces into registry with said shaping surface.

3. A method according to claim 1, wherein said frame and said shaping surface are concurrently moved, the bending of said sheet being completed prior to attaining a substantially vertical disposition.

4. Apparatus for heat treating glass sheets comprising: a conveyor for supporting and conveying a glass sheet in a substantially horizontal plane for movement along a horizontal path through a furnace, a pivotal frame exteriorly of said furnace, a bending member mounted on said pivotal frame and having an upwardly facing shaping surface formed thereon, retractable stop means on said frame engageable by the leading edge of said sheet, a plurality of conveyor rolls mounted on said frame and forming a continuation of said conveyor for supporting a glass sheet above said shaping surface, means on said pivotal frame for driving said series of conveyor rolls to advance said sheet against said stop means, means for moving said shaping surface upwardly to engage and lift said sheet above said conveyor rolls to effect shaping of said sheet, glass receiving means spaced rearwardly of said pivotal frame, means for swinging said pivotal frame upwardly relative to said horizontal path into a substantially vertical plane to effect pivotal movement of said sheet about said leading edge in an arcuate path past a true vertical and onto said glass receiving means, and means lowering said receiving means into a quench tank for immersing the glass sheet carried thereby into a bath of coolant.

5. Apparatus according to claim 4, including means for pivoting said stop means from said glass engaging position to transfer said glass sheet leading edge onto said receiving means.

6. Apparatus according to claim 4, wherein said receiving means comprises a receiving element having spaced upright legs formed at their lower ends with inturned feet disposed below said sheet when in an upright position for supporting the leading edge of said glass sheet deposited thereon.

7. Apparatus according to claim 6, wherein said stop means comprises a pair of spaced stop members initially supporting the leading edge of said upright sheet and movable from above to below said feet to gently deposit said sheet thereon.

8. Apparatus according to claim 4, including means for rapidly moving said bending member vertically through said path to engage and lift said heated sheet above said path and cause said sheet to settle under the influence of inertial and gravitational forces into registry with said shaping surface.

9. Apparatus according to claim 8, wherein said pivotal frame is swung concurrently with vertical bodily movement of the bending member relative to said frame.

* * * * *